(12) United States Patent
Nakamura et al.

(10) Patent No.: US 7,317,376 B2
(45) Date of Patent: Jan. 8, 2008

(54) VEHICLE CONTROL SYSTEM AND METHOD

(75) Inventors: Kazunari Nakamura, Nishio (JP);
Kazuhiro Nakashima, Kariya (JP);
Takeshi Kumazaki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 11/188,862

(22) Filed: Jul. 26, 2005

(65) Prior Publication Data

US 2006/0022795 A1 Feb. 2, 2006

(30) Foreign Application Priority Data

Jul. 27, 2004 (JP) ............................. 2004-218543

(51) Int. Cl.
*G05B 19/00* (2006.01)

(52) U.S. Cl. .................... 340/5.61; 340/5.64; 340/5.28; 340/5.31; 340/5.52; 340/5.72; 340/426.11; 340/426.39

(58) Field of Classification Search ............... 340/5.61, 340/5.64, 5.31, 5.28, 5.52, 5.72, 426.11, 426.36
See application file for complete search history.

(56) References Cited

U.S. PATENT DOCUMENTS

| 6,700,476 | B1 * | 3/2004 | Okada et al. | 340/5.62 |
| 7,109,843 | B2 * | 9/2006 | Nagai et al. | 340/5.72 |
| 2005/0020212 | A1 * | 1/2005 | Hiramitsu et al. | 455/41.2 |
| 2006/0006984 | A1 * | 1/2006 | Takahashi | 340/5.61 |

FOREIGN PATENT DOCUMENTS

JP A-2001-115705 4/2001

* cited by examiner

*Primary Examiner*—Tai Nguyen
(74) *Attorney, Agent, or Firm*—Posz Law Group, PLC

(57) ABSTRACT

A backup communication is automatically executed if a smart ID does not come back from a portable device though a comparison ECU transmits a smart ID request. In the backup communication, the comparison ECU transmits an immobilized ID request through a coil. The portable device receives the immobilized ID request if a user brings the portable device close to an engine start switch. The portable device transmits the immobilizer ID to comparison ECU. The comparison ECU sends the immobilizer ID to an ID box. The ID box compares the immobilizer ID sent from the comparison ECU with the ID stored therein. If the immobilizer ID corresponds to the stored ID, an engine ECU allows an engine start.

27 Claims, 2 Drawing Sheets

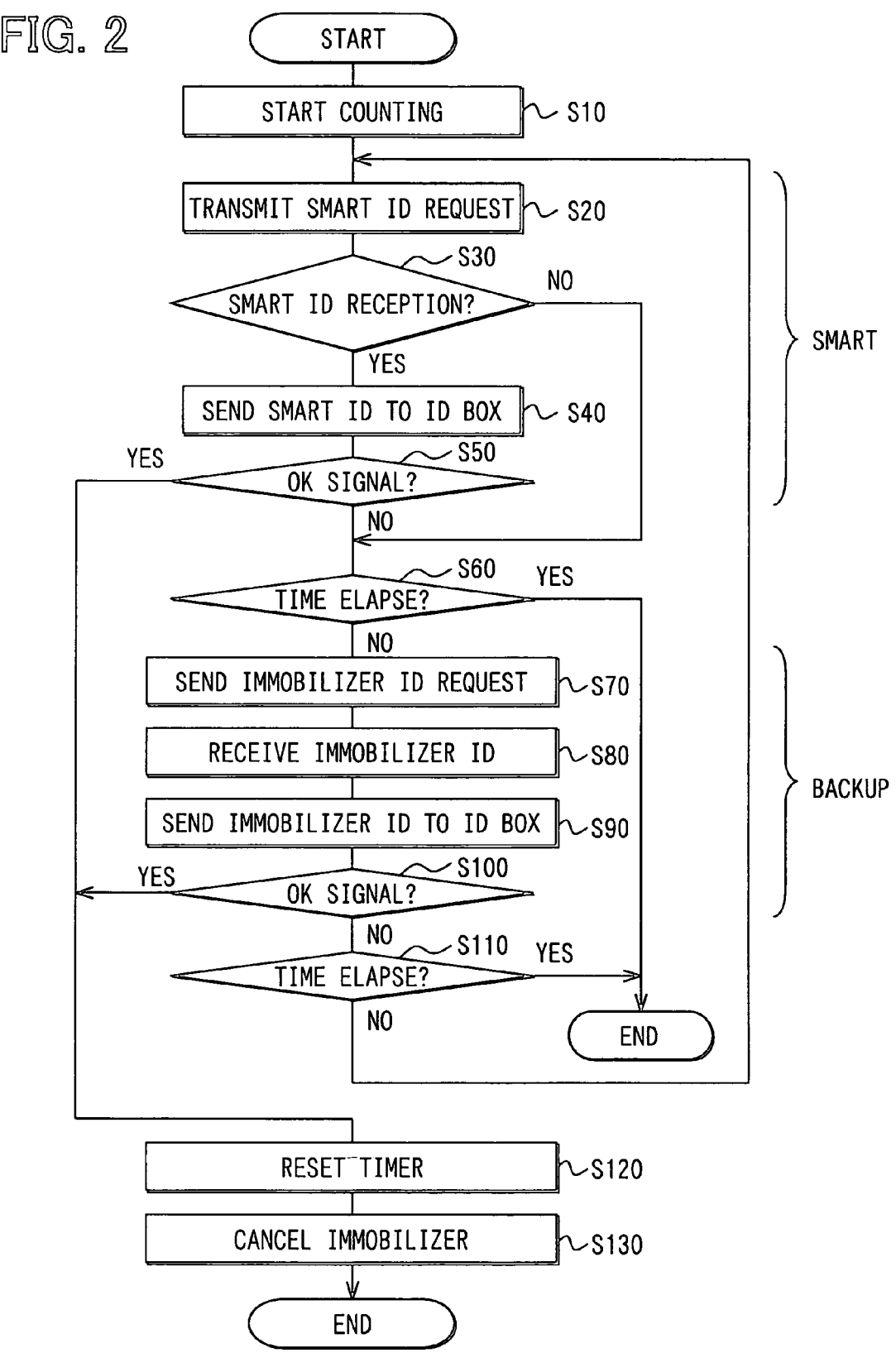

VEHICLE CONTROL SYSTEM AND METHOD

CROSS REFERENCE TO RELATED-APPLICATION

This application is based on Japanese Patent Application No. 2004-218543 filed on Jul. 27, 2004, the disclosure of which is incorporated herein by reference.

FIELD OF THE INVENTION

The present invention relates to a vehicle control system, and especially a smart entry system for a vehicle having a push start operation.

BACKGROUND OF THE INVENTION

A smart entry system is known in the art, for example as disclosed in JP 2001-115705 A. In this system, an identification code (ID) transmitted by a portable device is compared with a specific ID assigned to a vehicle when a user having the portable device for a smart entry approaches the vehicle. A door of the vehicle is unlocked if the ID of the portable device corresponds to the specific ID.

The smart entry system has a push-start operation, so that an engine start is attained by only pushing a push-start switch provided in the vehicle if the ID of the portable device corresponds to the specific ID.

The portable device cannot transmit the ID when it is broken or its battery runs down. In this case, the ID is sent to an Electronic Control Unit (ECU) controlling the smart entry system by a transponder operation of an immobilizer, in which the ID is sent by energizing a coil in a slot, so that the ID is compared with the specific ID, when the portable device is inserted into a slot and the push-start switch is pushed. In this way, a backup comparison can be executed when the portable device is broken or its battery runs down.

However, the slot is provided at the vehicle only for the backup comparison, although the backup comparison is not made very often.

SUMMARY OF THE INVENTION

The present invention is made in view of the above problem. It is an object of the present invention to provide a smart entry system having a start switch, in which a backup comparison can be executed without a slot.

According to the invention, a smart entry system executes a smart communication. In this communication, a portable device carried by a user transmits a smart ID when a comparison controller in a vehicle transmits a smart ID request. The smart ID is received by a first receiver, and then, it is sent to the comparison controller. When the smart ID is not transmitted from the portable device though the comparison controller transmits the smart ID request, a backup communication is executed. In this communication, an immobilizer ID received by a second receiver is compared with an immobilizer ID stored in a vehicle. The smart communication and the backup communication are repeatedly executed.

The portable device can receive an immobilizer ID request if a user brings the portable device close to the second receiver at any timing.

According to the invention, the comparison controller automatically transmits the immobilizer ID request to the portable device, if a predetermined condition is not satisfied after the comparison controller transmits the smart ID request. The comparison controller enables a predetermined device in the vehicle to be operated when the comparison controller determines that the smart ID or the immobilizer ID received by the receiver corresponds to the smart ID or the immobilizer ID stored in the vehicle.

BRIEF DESCRIPTION OF THE DRAWINGS

The above and other objects, features and advantages of the present invention will become more apparent from the following detailed description made with reference to the accompanying drawings. In the drawings:

FIG. 2 is a flow chart showing a smart communication and a backup communication executed by a comparison ECU in the embodiment.

DETAILED DESCRIPTION OF THE PREFERRED EMBODIMENTS

First Embodiment

Figure 1:
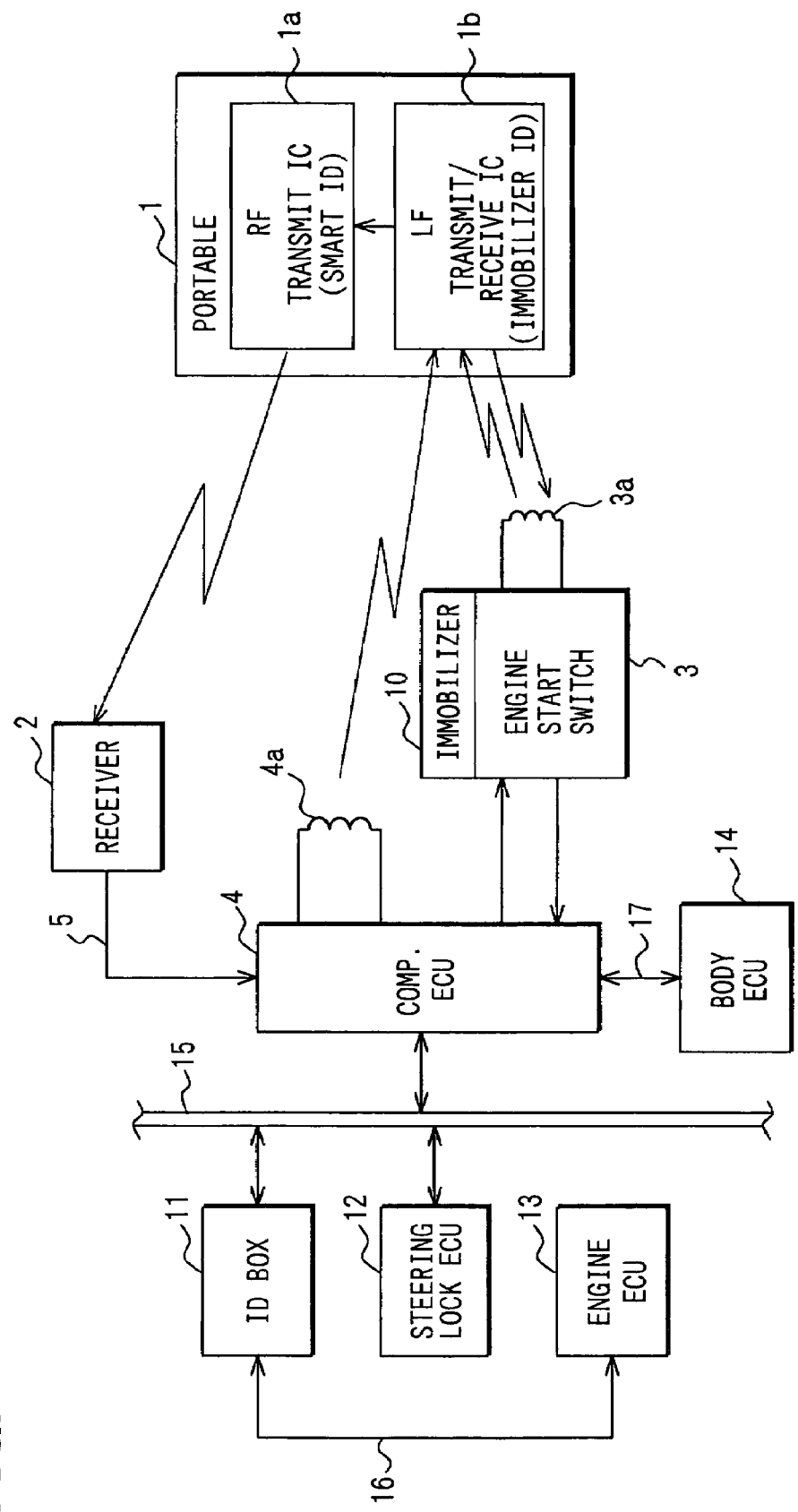
FIG. 1 is a schematic view showing a smart entry system and a control system cooperating with the same according to an embodiment of the present invention.

As shown in FIG. 1, a smart entry system comprises a portable device 1 carried by a user, an engine start switch 3 integrated with an immobilizer 10 of a vehicle and a comparison ECU 4. The comparison ECU 4 is connected to a vehicle control system, which comprises an ID box 11, a steering lock ECU 12, an engine ECU 13 and a body ECU 14.

The portable device 1 comprises a transmitter 1a transmitting a radio wave in a Radio Frequency (RF)-band and a transmitter/receiver 1b transmitting and receiving a radio wave in a Law Frequency (LF)-band. The transmitter 1a stores a smart ID. The transmitter/receiver 1b is operated by the conventional transponder operation. The transmitter/receiver 1b sends the request signal to the transmitter 1a, when receiving a smart ID request from the comparison ECU 4. The transmitter 1a transmits the smart ID as the radio wave in the RF-band, when receiving a request signal from the transmitter/receiver 1b. The transmitter/receiver 1b stores an immobilizer ID. The transmitter/receiver 1b transmits the immobilizer ID as the radio wave in the LF-band to the engine start switch 3, when receiving an immobilizer ID request from the engine start switch 3.

A receiver 2 is connected to the comparison ECU 4 by a wire, and sends the smart ID to the comparison ECU 4 after receiving the smart-ID from the transmitter 1a.

The engine start switch 3 is connected to the comparison ECU 4, and is arranged adjacent to, for example, a steering wheel in the vehicle. The engine start switch 3 is integrated with the immobilizer 10. An engine start is attained when the engine start switch 3 is pushed. The engine start switch 3 has a coil 3a, which operates as an antenna to transmit or receive the radio wave. The engine start switch 3 transmits the immobilizer ID request to the transmitter/receiver 1b, when receiving it from the comparison ECU 4. Further, the engine start switch 3 sends the immobilizer ID to the comparison ECU 4, when receiving it from the transmitter/receiver 1b.

The comparison ECU 4 operates as a smart ECU and an immobilizer ECU. The comparison ECU 4 has an antenna 4a in the vehicle, so that the smart ID request is transmitted to the portable device 1 through the antenna 4a. Then, the smart ID is automatically transmitted from the portable device 1. The comparison ECU 4 sends the smart ID to the ID box 11 when receiving the smart ID from the receiver 3. The ID box 11 compares the smart ID from the receiver 2 with a specific smart ID assigned to each vehicle and stored therein. The ID box 11 sends a corresponding signal (OK signal) to the comparison ECU 4 when determining that the smart ID from the receiver 2 corresponds to the smart ID stored therein. The comparison ECU 4 cancels an immobilizer operation when receiving the corresponding signal from the ID box 11.

The ID box 11, the steering lock ECU 12, and the comparison ECU 4 are connected in such a manner that they can communicate with each other through a LAN (LIN) 15. The ID box 11 communicates with the engine ECU 13 through a wire 16. The body ECU 14 communicates with the comparison ECU 14 through a wire 17.

The ID box 11 stores the smart ID, the immobilizer-ID, and each of an ID stored in the steering lock ECU 12 and the engine ECU 13. The ID box 11 compares each of the stored ID with each of the ID sent from the comparison ECU 4, steering lock ECU 12, and engine ECU 13. The ID box 11 sends the corresponding signal to each ECU if each of the stored ID corresponds to the ID sent from each ECU. As for the engine ECU 13, the ID box 11 may compare the stored ID with the ID sent from the engine ECU 13 after all of the stored IDs correspond to all of the IDs sent from each ECU (except the engine ECU). That is, the ID box 11 sends an ID request to the engine ECU 13 after all of the stored IDs correspond to all of the IDs sent from each ECU. The ID stored in the engine ECU 13 is sent to the ID box 11, and the ID box 11 may compare the ID sent from engine ECU 13 with the stored ID.

The body ECU 14 recognizes an open/close condition of a door (not shown), and controls a lock/unlock of the door. The body ECU 14 communicates the open condition of the door to the comparison ECU 4 when the door is opened.

The steering lock ECU 12 controls the lock/unlock condition of a steering wheel. The steering lock ECU 12 sends the ID stored therein to the ID box 11, and unlocks the steering wheel when receiving the corresponding signal from the ID box 11.

The engine ECU 13 controls an engine (not shown). The engine ECU 13 sends the ID stored therein to the ID box 11, and sends an engine start permitting signal when the ID box 11 determines that the ID sent from the engine ECU 13 corresponds to the ID stored in the ID box 11. The engine start can be attained, only after the engine start is permitted and the user pushes the engine start switch 3.

Next, the operation of the smart entry system and the control system will be explained.

At first, in the smart entry system and the vehicle control system, the door unlock control is executed.

The comparison ECU 4 transmits the smart ID request through the antenna 4a (transmitter arranged at the doorknob not shown in FIG. 1). The transmitter/receiver 1b sends the request signal to the transmitter 1a when receiving the smart ID request from the comparison ECU 4, so that the transmitter 1a transmits the smart ID stored therein to the receiver 2.

The smart ID is sent to the comparison ECU 4 through the wire 5 when the receiver 2 receives the smart ID. Then, the smart ID is sent to the ID box 11, and the ID box 11 compares the ID stored therein with the smart ID sent from the comparison ECU 4. The ID box 11 sends the corresponding signal to the body ECU 14 when the ID box 11 determines that the stored ID corresponds to the smart ID sent from the comparison ECU 4, so that the body ECU 14 unlocks the door.

When the user opens the door, the body ECU 14 recognizes the open condition of the door and sends the open condition signal to the comparison ECU 4.

Then, the smart entry system and the control system repeatedly execute a smart communication and a backup communication during the predetermined period when the door is opened or the user pushes the push switch 3 to attain the engine start or the user press a brake pedal. This operation will be explained with reference to FIG. 2.

The comparison ECU 4 starts counting time at a step S10 when a signal corresponding to a door opening operation or the engine start switch pushing operation or a brake pedal pressing operation is inputted into the comparison ECU 4. Next at a step S20, the comparison ECU 4 transmits the smart ID request as the radio wave in the LF-band about 134 kHz through the antenna 4a in order to detect whether the portable device 1 exists in the vehicle or not, so that the smart communication starts.

The portable device 1 receives the smart ID request by the transmitter/receiver 1b and transmits the smart ID as the radio wave in the RF-band about 314 kHz from the transmitter 1a. The smart ID transmitted from the portable device 1 is received by the receiver 2, and the receiver 2 sends the smart ID to the comparison ECU 4.

At a step S30, the comparison ECU 4 determines whether the smart ID transmitted from the portable device 1 is received or not after it transmits the smart ID request at the step S20. If the comparison ECU 4 determines that the smart ID is received from the portable device 1, it sends the smart ID to the ID box 11 at a step S40. The ID box 11 determines whether the smart ID sent from the comparison ECU 4 corresponds to the ID stored therein or not. If the ID box 11 determines that the smart ID sent from the comparison ECU 4 corresponds to the stored ID, the ID box 11 sends the corresponding signal (OK signal) to the comparison ECU 4. Then, the comparison ECU 4 receives the corresponding signal from the ID box 11 YES at a step S50) and resets the timer at a step S120.

Next, the ID box 11 compares the ID stored therein with the ID sent from the steering lock ECU 12 and the engine ECU 13. The ID box 11 sends the corresponding signal to each ECU if the stored IDs correspond to the IDs sent from each ECU. Then, the engine ECU 13 sends the engine start permitting signal if all of the stored IDs correspond to the all of the IDs sent from each ECU.

The comparison ECU 4 cancels the immobilizer operation at a step S130, and sends a canceling condition signal to the ID box 11. The steering lock ECU 12 unlocks the steering. The engine ECU 13 prepares to attain the engine start. The engine start is attained when the user pushes the engine start switch 3.

If the smart ID is not received from the portable device 1 (NO at the step S30) or the smart ID received from the portable device 1 does not correspond to the stored ID (No at the step S50), the smart communication is not satisfied. Then, at a step S60, the comparison ECU 4 determines whether a predetermined period elapses or not since the timer starts counting. If the comparison ECU 4 determines that the predetermined period does not elapse (No at the step S60), it sends the immobilizer ID request to the engine start switch 3 in order to detect whether the portable device 1 exists in the vehicle or not at a step S70. Then, the comparison ECU 4 starts the backup communication, so that the engine start switch 3 automatically transmits the immobilizer ID request as the radio wave in the LF-band through the coil 3a.

The portable device 1 receives the immobilizer ID request if the user brings the portable device 1 close to the engine start switch 3, for example, about 10 cm, so that the immobilizer ID request can be received by the portable device 1.

The portable device 1 receives the immobilizer ID request by the transmitter/receiver 1b and transmits the immobilizer ID as the radio wave in the LF-band through the transmitter/receiver 1b. Then, the comparison ECU 4 receives the immobilizer ID sent from portable device 1 through the coil 3a at a step S80.

The comparison ECU 4 sends the immobilizer ID to the ID box 11 at a step S90. The ID box 11 compares the ID stored therein with the immobilizer ID sent from the comparison ECU 4. The ID box 11 determines that the immobilizer ID sent from the comparison ECU 4 corresponds to the stored ID. If the comparison ECU 4 receives the corresponding signal (OK signal) YES at a step S100), the comparison ECU 4 resets the timer at the step S120. Then, the comparison ECU 4 cancel the immobilizer operation at step S130 so that the user is allowed to start the engine.

If the immobilizer ID transmitted from the portable device 1 does not correspond to the stored ID (NO at the step S100), the backup communication is not satisfied. Then, at a step S110, the comparison ECU 4 determines whether the predetermined period elapses or not since the timer starts counting. If the comparison ECU 4 determines that the predetermined period does not elapse (NO at the step S110), going back to the step S20, the comparison ECU 4 transmits the smart ID request again through the antenna 4a. That is, the smart communication starts again if the backup communication is not satisfied.

If the smart ID or the immobilizer ID does not correspond to the stored ID (NO at the step S50 or S100) and the comparison ECU 4 determines that the predetermined period elapses since the timer starts (YES at the step S60 or S110), the comparison ECU 4 resets the timer and the smart communication or the backup communication is finished. That is, the smart communication and the backup communication can be repeatedly executed until the predetermined period elapses.

The smart communication or the backup communication is also finished when the smart ID or the immobilizer ID stored in the ID box 11 corresponds to the smart ID or the immobilizer ID transmitted from the portable device 1 (YES at the step S60 or S110).

The smart entry system alternately and repeatedly executes the smart communication and the backup communication. The portable device 1 can receive the immobilizer ID request if the user brings the portable device 1 close to the engine start switch 3 at any timing, as long as the backup communication is repeatedly executed.

Therefore, the smart entry system of the present embodiment can certainly execute the backup communication without the conventional slot.

Further, in the smart entry system, the engine start switch 3 is integrated with the immobilizer 10, so that a space to provide the engine start switch and the immobilizer 10 can be saved.

Moreover, the coil 3a is operated as the antenna, so that a structure can be simplified in comparison with a structure that both a coil and an antenna are provided.

Modified Embodiment

In the embodiment, the smart communication and the backup communication are repeatedly executed during the predetermined period when the door is opened or the user pushes the push switch or the user presses the brake pedal. The predetermined period is not restricted in such a manner. For example, the smart communication and the backup communication may be executed while the user acts to the vehicle in a predetermined way.

The smart communication and the backup communication may be alternately executed one by one, or with respect to more than one.

The engine switch and the immobilizer may be separated.

Though the ID box 11 stores each ID and compares the IDs stored therein with the IDs from each ECU, the comparison ECU 4 may store the IDs and compare the IDs.

What is claimed is:

1. A vehicle control system for a predetermined device in a vehicle, the system comprising:
    a portable device for storing a first device ID and a second device ID;
    a transmitter for transmitting a first request so that the portable device transmits the first device ID when receiving the first request, and
    a comparison controller for comparing the first device ID with a first reference ID stored in a vehicle, and for allowing a predetermined device in the vehicle to be operated, when the first device ID corresponds to the first reference ID,
    wherein the comparison controller determines whether the first device ID is received in response to the first request,
    wherein the comparison controller automatically transmits, when the first device ID is not received, a second request through the transmitter so that the portable device transmits the second device ID when receiving the second request, and
    wherein the comparison controller compares the second device ID with a second reference ID stored in the vehicle, and allows the predetermined device to be operated when the second device ID corresponds to the second reference ID.

2. A vehicle control system comprising:
    a portable device for storing and transmitting a smart ID and an immobilizer ID;
    a first receiver for receiving the smart ID transmitted from the portable device;
    a second receiver for receiving the immobilizer ID transmitted from the portable device;
    a comparison controller for comparing the smart ID and the immobilizer ID received by the first receiver and the second receiver with a smart ID and an immobilizer ID stored in a vehicle;
    a first transmitter for transmitting a smart ID request to the portable device;
    a second transmitter for transmitting an immobilizer ID request to the portable device; and
    an engine start switch for attaining an engine start,
    wherein the comparison controller executes a smart communication, in which the portable device transmits the smart ID when the comparison controller transmits the smart ID request to the portable device through the first transmitter, and when the first receiver receives the smart ID, the smart ID is sent to the comparison controller, and
    wherein the engine start is attained by pushing the engine start switch when the comparison controller determines that the smart ID received by the first receiver corresponds to the smart ID stored in the vehicle, characterized in that the comparison controller executes a backup communication if the portable device does not transmit the smart ID though the comparison controller transmits the smart ID request to the portable device, in which the comparison controller transmits the immobilizer ID request to the portable device through the second transmitter, and the portable device transmits the immobilizer ID to the second receiver when receiving the immobilizer ID request, and the comparison controller compares the immobilizer ID received by the second receiver with the immobilizer ID stored in a vehicle, and the smart communication and the backup communication are repeatedly executed.

3. A vehicle control system according to claim 2, wherein the smart communication and the backup communication are alternately executed.

4. A vehicle control system according to claim 2, wherein the smart communication and the backup communication are repeatedly executed during a predetermined period.

5. A vehicle control system according to claim 4, wherein the predetermined period starts after a door of the vehicle is opened.

6. A vehicle control system according to claim 4, wherein the predetermined period starts after the engine start switch is operated.

7. A vehicle control system according to claim 4, wherein the predetermined period corresponds to a period, in while a brake pedal of the vehicle continues to be pressed.

8. A vehicle control system according to claim 2, wherein the smart communication and the backup communication are repeatedly executed until the comparison controller determines that the smart ID received by the first receiver or the immobilizer ID received by the second receiver corresponds to the smart ID or the immobilizer ID stored in the vehicle.

9. A vehicle control system according to claim 2, further comprising:

an immobilizer having an immobilizer coil operated as the second receiver and the second transmitter.

10. A vehicle control system according to claim 9, wherein the engine start switch is integrated with the immobilizer.

11. A vehicle control system according to claim 2, wherein:

the portable device comprises a transmitter storing the smart ID and a transmitter/receiver storing the immobilizer ID, the transmitter transmits the smart ID, when the transmitter/receiver receives the smart ID request and sends the smart ID request to the transmitter, and the transmitter/receiver transmits the immobilizer ID, when receiving the immobilizer ID request.

12. A vehicle control system comprising:

a portable device for storing and transmitting a smart ID and an immobilizer ID;

a receiver for receiving the smart ID and the immobilizer ID transmitted from the portable device;

a comparison controller for comparing the smart ID and the immobilizer ID received by the receiver with a smart ID and an immobilizer ID stored in a vehicle; and a transmitter for transmitting a smart ID request and an immobilizer request to the portable device, wherein the comparison controller executes a smart communication, in which the portable device transmits the smart ID when the comparison controller transmits the smart ID request to the portable device through the transmitter, and the receiver receives the smart ID and sends the smart ID to the comparison controller, characterized in that the comparison controller automatically transmits the immobilizer ID request to the portable device through the transmitter, if the predetermined condition is not satisfied after the comparison controller transmits the smart ID request, the portable device transmits the immobilizer ID when receiving the immobilizer ID request, the comparison controller executes a backup communication, in which the comparison controller compares the immobilizer ID received by the receiver with the immobilizer ID stored in the vehicle, and wherein the comparison controller enables a predetermined device in the vehicle to be operated when the comparison controller determines that the smart ID or the immobilizer ID received by the receiver corresponds to the smart ID or the immobilizer ID stored in the vehicle.

13. A vehicle control system according to claim 12, wherein the comparison controller transmits the immobilizer ID request to the portable device through the transmitter, if the smart ID is not transmitted from the portable device though the comparison controller transmits the smart ID request to the portable device.

14. A vehicle control system according to claim 12, wherein the receiver comprises a first receiver for receiving the smart ID and a second receiver for receiving the immobilizer ID.

15. A vehicle control system according to claim 12, wherein the transmitter comprises a first transmitter for transmitting the smart ID request to the portable device and a second transmitter for transmitting the immobilizer ID request to the portable device.

16. A vehicle control system according to claim 12, further comprising:

an engine start switch for attaining an engine start, wherein the engine start is attained by operating the engine start switch when the comparison controller determines that the smart ID or the immobilizer ID received by the receiver corresponds to the smart ID or the immobilizer ID stored in the vehicle.

17. A vehicle control system according to claim 12, wherein the smart communication and the backup communication is repeatedly executed.

18. A vehicle control system according to claim 12, wherein the smart communication and the backup communication is alternately executed.

19. A vehicle control system according to claim 12, wherein the smart communication and the backup communication are repeatedly executed during a predetermined period.

20. A vehicle control system according to claim 19, wherein the predetermined period starts after a door of the vehicle is opened.

21. A vehicle control system according to claim 19, further comprising:

an engine start switch for attaining an engine start, wherein the predetermined period starts after the engine start switch is pushed.

22. A vehicle control system according to claim 19, wherein the predetermined period is set to correspond to a period, in which a brake pedal of the vehicle continues to be pressed.

23. A vehicle control system according to claim 17, wherein the smart communication and the backup communication are repeatedly executed until the comparison controller determines that the smart ID or immobilizer ID received by the receiver corresponds to the smart ID or the immobilizer ID stored in the vehicle.

24. A vehicle control system according to claim 12, wherein:
the receiver comprises a first receiver for receiving the smart ID and a second receiver for receiving the immobilizer ID;
the transmitter comprises a first transmitter for transmitting the smart ID request to the portable device and a second transmitter for transmitting the immobilizer ID request to the portable device, and further comprises;
an immobilizer having an immobilizer coil is provided to be operated as the second receiver and the second transmitter.

25. A vehicle control system according to claim 24, wherein the immobilizer is operated as an engine start switch for attaining an engine start.

26. A vehicle control system according to claim 12, wherein:
the portable device comprises a transmitter storing the smart ID and a transmitter/receiver storing the immobilizer ID,
the transmitter transmits the smart ID, when the transmitter/receiver receives the smart ID request and sends the smart ID request to the transmitter; and
the transmitter/receiver transmits the immobilizer ID, when receiving the immobilizer ID request.

27. A vehicle control method comprising steps of:
transmitting a first request as a first radio wave from a vehicle so that a portable device carried by a user transmits a first device ID stored therein when receiving the first request;
comparing the first device ID received from the portable device with a first reference ID stored in the vehicle; and
allowing an engine start by the user when the first device ID corresponds to the first reference ID,
wherein the method further comprises:
checking whether the first device ID is received in response to the first request;
transmitting automatically, when no first device ID is received, a second request as a second radio wave so that the portable device transmits a second device ID stored therein when receiving the second request;
comparing the second device ID received from the portable device with a second reference ID stored in the vehicle; and
allowing the engine start by the user when the second device ID corresponds to the second reference ID.

* * * * *